United States Patent
Enzinger et al.

(10) Patent No.: US 10,923,779 B2
(45) Date of Patent: Feb. 16, 2021

(54) METHOD FOR COORDINATING A CHARGING OPERATION OF A PILOTED MOTOR VEHICLE, STORAGE MEDIUM, MOBILE TERMINAL DEVICE, AND SERVER APPARATUS

(71) Applicant: AUDI AG, Ingolstadt (DE)

(72) Inventors: Tobias Enzinger, Freinhausen (DE); Benjamin Soehnle, Ingolstadt (DE); Florian Schuller, Ismaning (DE); Sebastian Falk, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 133 days.

(21) Appl. No.: 16/137,858

(22) Filed: Sep. 21, 2018

(65) Prior Publication Data

US 2019/0089024 A1 Mar. 21, 2019

(30) Foreign Application Priority Data

Sep. 21, 2017 (DE) .......................... 102017216748.3

(51) Int. Cl.
*H01M 10/48* (2006.01)
*G05B 23/02* (2006.01)
(Continued)

(52) U.S. Cl.
CPC ............ *H01M 10/486* (2013.01); *B60L 15/20* (2013.01); *B60L 53/50* (2019.02); *B60L 53/62* (2019.02);
(Continued)

(58) Field of Classification Search
CPC ................ H01M 10/486; H01M 10/48; G05B 23/0283; G05B 23/02; G07C 5/0808;
(Continued)

(56) References Cited

U.S. PATENT DOCUMENTS

2010/0123436 A1\* 5/2010 Herrod ...................... H02J 7/00
320/132
2010/0312838 A1\* 12/2010 Lyon .................... G06Q 10/109
709/206
(Continued)

FOREIGN PATENT DOCUMENTS

DE      10 2011 015 778 A1    10/2012
DE      10 2011 088 809 A1     6/2013
(Continued)

OTHER PUBLICATIONS

German Search Report dated Oct. 4, 2019, in connection with corresponding DE Application No. 10 2017 216 748.3 (18 pgs., including machine-generated English translation).

*Primary Examiner* — Richard Isla
*Assistant Examiner* — Dung V Bui
(74) *Attorney, Agent, or Firm* — Maier & Maier, PLLC (57) ABSTRACT

A method for coordinating a charging operation for charging an energy storage mechanism of a piloted motor vehicle. A control mechanism that is external to the vehicle carries out: provision of a state-of-charge signal, which describes a current state of charge; provision of a schedule calendar signal, which describes schedule information of a user, on the basis of the provided schedule calendar signal; establishing a point in time of the time schedule; establishment of a state of charge as a threshold value required for adhering to the time schedule; if the current state of charge corresponds to the threshold value or drops below the threshold value, setting of geographic coordinates of a charging station as a drive destination that makes available at least one charging facility for charging the energy storage mechanism, and generation of a control signal for steering the motor vehicle.

8 Claims, 2 Drawing Sheets

(51) Int. Cl.
*G07C 5/08* (2006.01)
*B66B 1/30* (2006.01)
*B60L 15/20* (2006.01)
*B60L 11/18* (2006.01)
*B60L 58/12* (2019.01)
*B60L 53/65* (2019.01)
*B60L 53/62* (2019.01)
*G07C 5/00* (2006.01)
*B60L 53/66* (2019.01)
*B60L 53/68* (2019.01)
*B60L 53/50* (2019.01)

(52) U.S. Cl.
CPC ............. *B60L 53/65* (2019.02); *B60L 53/665* (2019.02); *B60L 53/68* (2019.02); *B60L 58/12* (2019.02); *B66B 1/30* (2013.01); *G05B 23/0283* (2013.01); *G07C 5/008* (2013.01); *G07C 5/0808* (2013.01); *B60L 2250/14* (2013.01); *B60L 2260/32* (2013.01)

(58) Field of Classification Search
CPC ....... G07C 5/08; B60L 2260/32; B60L 15/20; B60L 11/1861; B60B 1/30
USPC .......................................... 320/109
See application file for complete search history.

(56) References Cited

U.S. PATENT DOCUMENTS

| | | | |
|---|---|---|---|
| 2011/0022256 A1* | 1/2011 | Asada | B60L 53/65 701/22 |
| 2013/0110296 A1* | 5/2013 | Khoo | G06Q 10/02 700/286 |
| 2014/0025799 A1* | 1/2014 | Azizi | H04L 41/00 709/223 |
| 2014/0045481 A1* | 2/2014 | Fraley | H04W 52/0258 455/418 |
| 2015/0094928 A1* | 4/2015 | Matsumura | B60W 30/143 701/93 |
| 2015/0149221 A1* | 5/2015 | Tremblay | G06Q 10/02 705/5 |
| 2015/0348335 A1* | 12/2015 | Ramanujam | G05D 1/0088 701/23 |
| 2016/0052413 A1* | 2/2016 | Shimizu | H02J 3/00 700/291 |
| 2017/0212631 A1* | 7/2017 | Kim | G06F 3/04883 |
| 2017/0250550 A1* | 8/2017 | Miftakhov | B60L 53/68 |

FOREIGN PATENT DOCUMENTS

| | | |
|---|---|---|
| DE | 10 2012 011 605 A1 | 6/2013 |
| DE | 10 2013 007 525 A1 | 10/2014 |
| DE | 10 2015 002 913 A1 | 9/2016 |
| DE | 10 2016 100 530 A1 | 7/2017 |
| EP | 1 076 029 A1 | 2/2001 |

* cited by examiner

METHOD FOR COORDINATING A CHARGING OPERATION OF A PILOTED MOTOR VEHICLE, STORAGE MEDIUM, MOBILE TERMINAL DEVICE, AND SERVER APPARATUS

FIELD

The invention relates to a method for coordinating or assisting a charging operation of an energy storage mechanism of a piloted motor vehicle. An energy storage mechanism is understood here to mean an energy storage unit for storing electrical or chemical energy and can be designed, for example, as a fuel tank or a rechargeable battery or a traction battery.

BACKGROUND

Even today, there are not enough charging stations and gas stations in cities, although many gas stations already make available, for example, additional charging facilities for electric motor vehicles, that is, devices for charging the energy storage unit, and although, in the meantime, charging parks or charging stations with a plurality of charging facilities have appeared.

As an alternative for charging the energy storage mechanism at a public charging station, the energy storage mechanism for the storage of electricity can also be charged at a house connection. However, this presumes that a user of the motor vehicle—for example, the user of an electric motor vehicle or a hybrid motor vehicle—is at home or does not need the automobile, and this operation further requires that the user himself/herself takes care of the charging operation.

For the management and recharging of an energy source of an autonomous vehicle, EP 1 076 029 A1 proposes a formula as to how a required energy can be determined. The problem posed above is not addressed, however, nor is it solved.

Known from DE 10 2015 002 913 A1 is a method for driverless operation of a motor vehicle that has at least one intrinsic sensor, which receives sensor data describing the current state of the motor vehicle, with at least one state variable of the motor vehicle being derived from the sensor data of the at least one intrinsic sensor. When a diagnosis criterion that evaluates the state variable is met, with at least one action being assigned to each diagnosis criterion, the action assigned to the diagnosis criterion is automatically carried out. In this way, depending on a current state of charge, it can be concluded how long the energy storage mechanism needs to be charged.

In accordance with the prior art, the motor vehicle takes on the coordination of the charging operation, as a result of which, although the user is relieved, any control or monitoring is also relinquished. For carrying out the last mentioned method of the prior art, the motor vehicle needs electricity, for which reason an additional demand is placed on the energy storage mechanism.

A further drawback ensues in that it is still not possible to build as many public charging stations as desired and many charging stations are placed at parking spots, which also are utilized solely as parking spots.

SUMMARY

An object on which the invention is based is the simplification of a coordination of a charging operation for charging the energy storage mechanism of the motor vehicle.

The object set forth is achieved by the method according to the invention and the apparatuses according to the invention in accordance with the independent patent claims. Advantageous enhancements are presented in the dependent claims.

The invention is based on the idea of transferring the coordination from the motor vehicle to a control mechanism that is external to the vehicle. Such a control mechanism that is external to the vehicle can be, for example, a control mechanism of a server apparatus in the Internet and/or of a mobile terminal device. Due to the transfer of the coordination, the energy storage mechanism of the motor vehicle is subjected to a smaller load. Moreover, a communication with the user is made possible, preferably via a mobile, portable terminal device of the user, as a result of which the user participates in the decision-making process and can influence it in a manner specific to the situation, without it being necessary for the user to be present at the motor vehicle for this purpose. Moreover, through the transfer of the coordination, a data communication link of the motor vehicle is relieved. The charging operation is therefore assisted by the method according to the invention.

The method according to the invention for coordinating a charging operation for charging an energy storage mechanism of a piloted motor vehicle is carried out by a control mechanism that is external to the vehicle. A control mechanism is understood here to mean a device or a device component for receiving and analyzing signals as well as for generating control signals. The control mechanism can be designed as a control chip or a control device, for example, and can preferably have a processor mechanism, that is, a device or a device component for electronic data processing with at least one microcontroller and/or at least one microprocessor. In this case, the processor mechanism can be equipped to execute a program code, wherein the program code is equipped so that when it is executed by the processor mechanism, the control mechanism external to the vehicle is caused to carry out one of the embodiments of the method according to the invention.

In a first method step, a signal for the state of charge that describes a current state of charge of the energy storage mechanism is provided. To this end, the state-of-charge signal can be received, for example, from a charging management system of the motor vehicle. The provision of a schedule calendar signal from a mobile terminal device then occurs, with the schedule calendar signal describing schedule information that relates to the time schedule of a user of the motor vehicle and of the mobile terminal device and is deposited in a digital calendar. For this purpose, the control mechanism can create, for example, a mobile communication link to the mobile terminal device, or, for example, after a synchronization of the calendar of the mobile terminal device with, for example, the schedule calendar deposited in the server apparatus, by way of example, to read out the schedule information.

On the basis of the provided schedule calendar signal, a point in time of the time schedule is established, and, as a threshold value, a required state of charge is established for adhering to the time schedule. For fixing the point in time, it is optionally possible, in addition, to establish a thematic context of the time schedule, for which purpose, for example, a text analysis of a text that is entered in the calendar in regard to the time schedule can occur. If, for example, the user has designated the time schedule as a "drive to Stuttgart," then, through such a text analysis, the word "Stuttgart," for example, can be determined to be the travel destination and, accordingly, to be the thematic context.

By way of example, for fixing the state of charge required as a threshold value for adhering to the time schedule, it is possible to calculate a distance from a place of residence of the user to the travel destination given by way of example and, on the basis thereof, a required state of charge can be calculated.

If the current state of charge agrees with the threshold value or exceeds the threshold value, geographic coordinates of a charging station are fixed as the drive destination, wherein the charging station makes available at least one charging facility for charging the energy storage mechanism. Accordingly, the drive destination does not mean the travel destination of the time schedule given by way of example, but rather a drive destination for charging the energy storage mechanism prior to the time scheduled for the trip.

Geographic coordinates of such a charging station can be deposited, for example, in a data storage unit or storage medium of the control mechanism or else the control mechanism can determine—for example, on the basis of a current position of the motor vehicle and, for example, on the basis of the geographic coordinates of at least one charging station, which are available on the Internet—which charging station is currently nearest in location or which charging stations are currently nearest in location. Alternatively or additionally, it may be of relevance, for example, whether, at that moment or at any time, the charging station can make available a free charging facility prior to the time scheduled for the trip.

Depending on the schedule information, a control signal is then generated for steering the motor vehicle to the fixed geographic coordinates of the charging station and for transmitting the generated control signal to a driver assistance mechanism of the motor vehicle. A driver assistance mechanism is understood to mean here a device or a device component for steering the motor vehicle in a piloted drive mode or, optionally, in a plurality of drive modes. In this case, the driver assistance mechanism can be, for example, a component of an onboard computer of the motor vehicle and/or it can be set up as a driver assistance system.

The above-mentioned advantages result. A further advantage results in that a balanced utilization and load distribution of the charging facilities is made possible. The charging facilities can thereby be utilized in a more efficient and amortized manner.

As a further advantage, there result additional possibilities for value creation for a motor vehicle dealer, for example, in that the possibilities of the motor vehicle dealer are increased to compensate for losses due to the loss of after-sales service, such as, for example, an oil change, in view of increasing electromobility. The motor vehicle dealer mentioned here by way of example earns money not only when the motor vehicle is sold, but also during its use. Furthermore, an increased customer comfort ensues, because the user can always have a charged automobile, even when the user himself/herself has no garage or charging possibility.

In accordance with a first embodiment of the method according to the invention, it is possible, on the basis of the provided schedule calendar signal, for the control mechanism to establish a parking parameter, with it being possible for the parking parameter to describe a parking period during which the motor vehicle is not used by the user, and/or a parking location of the motor vehicle. Establishing the geographic coordinates of the charging station can then be made depending on the established parking parameter. The charging operation can thereby be coordinated very exactly in regard to the time schedule, so that the motor vehicle is situated at the parking location on time at the beginning of the time scheduled for the trip when the user would like to pick up the motor vehicle.

In accordance with a preferred embodiment of the method according to the invention, the control mechanism can generate a notification signal, with it being possible for the notification signal to provide a message to the user in regard to information on the current state of charge and/or to describe a current remaining range of travel of the motor vehicle and/or a thematic context of the time schedule. A transmission of the generated notification signal to the mobile terminal device can then be made for the emission of the notification signal by the mobile terminal device. After the transmission of the generated notification signal, a receiving of an activation signal from the mobile terminal device can result, that is, a signal that enables travel to the charging station. Such an activation signal can be made, for example, by way of the mobile terminal device as a function of a control operation for confirming travel to the charging station. In this embodiment, the generation of the control signal and the transmission thereof to the driver assistance mechanism can be made as a function of the received activation signal. Through the communication with the control mechanism, the user is informed about the current situation and obtains control as to whether the motor vehicle is actually to proceed to the charging station. Even though the user is included in the decision-making process, the user does not need to be present at the motor vehicle, but rather travel to the charging station is also enabled in the case that the driver is just then in a shop or at the office.

Maintenance and care of the motor vehicle can be coordinated and assisted especially efficiently thanks to the following, especially preferred embodiment of the method according to the invention. In accordance therewith, a determination of a maintenance action for providing a functional state of a motor vehicle system of the motor vehicle is made by way of the control mechanism. For this purpose, the control mechanism can receive, for example, a corresponding signal that contains information from an electronic onboard log of the motor vehicle, or, for example, can receive a corresponding signal of an onboard computer of the motor vehicle, which, for example, may describe a low oil level. Alternatively, it is possible to deposit, in a data storage unit of the control mechanism, for example, information on whether and/or when the motor vehicle system needs to be maintained, repaired, or serviced.

In another method step, it is possible to determine whether or that the charging station offers a particular provided service in order to carry out the maintenance measure. Corresponding information can be queried, for example, from a server at the charging station. If the charging station offers the particular provided service, a service query signal, which can describe the maintenance action and/or the particular provided service, is generated and the generated service query signal is transmitted to the mobile terminal device for emission by the mobile terminal device. In other words, the user can receive, for example, a text message on the user's mobile telephone, in which it is indicated that the user can make use of the opportunity provided by the charging operation to replace the wiper blades at the same time.

Depending on a confirmation signal received from the mobile terminal device, it is possible for a an order signal to be generated, which can describe a release or confirmation for carrying out the maintenance action and/or the particular provided service. A transmission of the generated order signal to a communication mechanism of the charging station, that is, to a device or a device component for data communication, then results.

In accordance with an enhancement, the control mechanism can set a price for the maintenance action and/or for the particular provided service by way of, for example, a corresponding query, for example, at the server of the charging station. The generated service query signal can thereby describe the set price. Alternatively or additionally, when the confirmation signal is received, the control mechanism can debit a monetary value in the amount of the set price from an account of the user. If the control mechanism is, for example, a control mechanism of a data server on which the user of the motor vehicle has a user account, a corresponding monetary value, that is, a cash value, for the particular provided service, is automatically debited and, for example, remitted to the server of the charging station. Thanks to this enhancement, it is also possible to link fee-based particular provided services to the charging operation.

In accordance with another embodiment of the method according to the invention, it can be provided that the control mechanism makes available a data set that can describe the respective geographic coordinates relating to a plurality of charging stations. For each of the charging stations, a determination of the workload of the respective charging facilities can be made, that is, a determination as to whether the respective charging facilities of the respective charging station are currently in use and/or are reserved at a predetermined point in time or for a predetermined period of time. On the basis of the determined utilization, it is possible to establish at least one charging station as the travel destination, said charging station having available freely accessible charging facilities at a specified point in time or for a specified period of time. In this case, the specified point in time or period of time can preferably lie prior to the time scheduled for the trip. The coordination of the charging operation is even more efficient in this way, because fewer or no waiting times result at the charging station, and the user can anticipate that the charging operation will be concluded quickly. A further advantage thereby also ensues for an operator of a charging station, which, for example, may be a motor vehicle manufacturer, in that the charging facilities of the charging station are optimally utilized and can be amortized as quickly as possible. Another advantage ensues in that, thanks to this embodiment of the method according to the invention, it is also possible to coordinate a fleet of motor vehicles.

The object set forth above is achieved by a storage medium with a program code that, when run by a processor mechanism of a mobile terminal device and/or of a server apparatus, is equipped to execute a method according to one of the embodiments described above. The storage medium can be designed, for example, as a memory card or a memory chip. The above-mentioned advantages result.

The object set forth is achieved by a mobile, portable terminal device, such as, for example, a smartphone or tablet PC, with an embodiment of the storage medium according to the invention. The already mentioned advantages result.

The object set forth above is achieved by a server apparatus for operation on the Internet, said server apparatus having an embodiment of the storage medium according to the invention. Here, too, the above-mentioned advantages result. A server apparatus is a computer or a computer network operated in the Internet and can be embodied, for example, by a data server, a backend, or a data cloud.

BRIEF DESCRIPTION OF THE DRAWINGS

Exemplary embodiments of the invention are described below. Shown for this purpose are.

DETAILED DESCRIPTION

The exemplary embodiments explained below are preferred embodiments of the invention. In the exemplary embodiments, the described components of the embodiments each represent individual features of the invention that are independent of one another, each of which the invention also further develops independently of one another, and which are accordingly to be regarded, also individually or in a combination different from the combination shown, as belonging to the invention. Furthermore, the described embodiments can also be supplemented by features that are additional to the already described features of the invention.

In the figures, functionally identical elements are each furnished with the same reference numbers.

Figure 1:
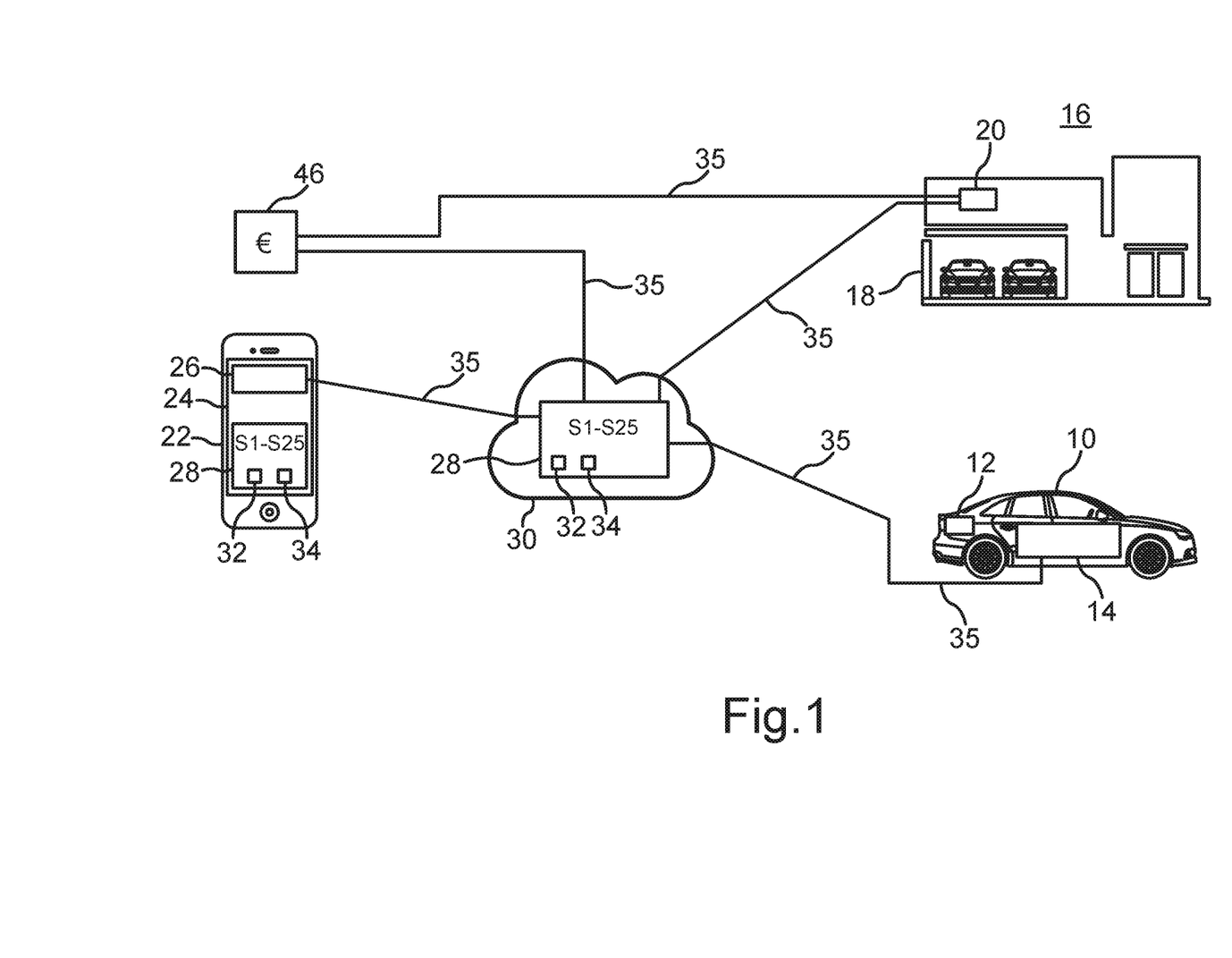
FIG. 1 a schematic illustration relating to a first exemplary embodiment of the method according to the invention.

FIG. 1 illustrates the principle of the method according to the invention on the basis of a first exemplary embodiment. For this purpose, FIG. 1 shows a motor vehicle 10, such as, for example, a passenger automobile, which can be designed, for example, as an electric motor vehicle or as a hybrid motor vehicle. The motor vehicle 10 has an energy storage mechanism 12, such as, for example, a traction battery. Moreover, the motor vehicle 10 has a driver assistance mechanism 14, which, for example, is designed as a driver assistance system and can operate the motor vehicle 10 preferably in a piloted drive mode.

FIG. 1 further shows, by way of example, a charging station 16, such as, for example, a charging park of a motor vehicle manufacturer. Shown in the charging station 16 of FIG. 1 is a charging facility 18, which, for example, can be equipped as a charging column or charging device. Because the method according to the invention can also be applied to motor vehicles 10 having an internal combustion engine, the charging facility 18 can also be designed, for example, as a fuel pump. In this case, the "charging" of the energy storage mechanism 12 can comprise a "filling" of a fuel tank as an energy storage mechanism 12.

The charging facility 18 can preferably be equipped to charge an energy storage mechanism 12 of electric motor vehicles 10, for example, inductively or by means of a charging cable. In FIG. 1, by way of example, a communication mechanism 20 of the charging station 16 is shown, such as, for example, a computer with Internet access or another communication device for creating data communication links, which, for example, can be wired or wireless, such as, for example, mobile communication links or WLAN links.

FIG. 1 further shows a mobile terminal device 22, which, for example, can be designed as a smartphone. In this case, the smartphone, by way of example, can have a display screen 24 as well as an optional communication mechanism 26, such as, for example, a module for data communication and/or telephony that is known from the prior art.

The mobile, portable terminal device 22 can optionally have a control mechanism 28. Preferably, however, the control mechanism 28 can be a component of a server apparatus 30 in the Internet, with the server apparatus 30 preferably being designed as a data cloud or, alternatively, as a data server. The control mechanism 28 can be designed, for example, as a control device or a control chip and can preferably have a processor mechanism 32 with at least one microcontroller and/or a microprocessor, or, for example, can be designed as software or an application program ("app"). The control mechanism 28 of the example of FIG. 1 can have a storage medium 34, such as, for example, a memory card or a memory chip, on which a program code for implementation of the method according to the invention can be stored.

FIG. 1 further shows data communication links 35 between the individual components, which, for example, can be designed as a wired data communication link 35 or as a wireless data communication link 35, such as, for example, a mobile communication link, a motor-vehicle-to-infrastructure link, or a WLAN link.

In the example of FIG. 1, a user of the motor vehicle 10, the energy storage mechanism 12 of which is just then nearly empty or will become nearly empty, for example, has parked at the user's workplace on Monday at 8 a.m. and does not need the motor vehicle for the next six hours.

In a first method step S1, the control mechanism 28 provides a state-of-charge signal, which describes the current state of charge of the energy storage mechanism 12, that is, in the example of FIG. 1, a very low state of charge. The providing of the state-of-charge signal (S1) can be queried, for example, by retrieving the state-of-charge signal from, for example, an onboard computer (not shown in FIG. 1), or, for example, can be transmitted at regular intervals or, when a communication link 35 is present, automatically, by way of example, from the onboard computer to the control mechanism 28. By way of example, through such a query, for example, of a wireless data communication link 35 between the control mechanism 28 and the communication mechanism 26 of the mobile terminal device 22, it is possible for the schedule calendar signal to be received from the mobile terminal device 22 and accordingly provided (S2), with the schedule calendar signal being able to describe, for example, information relating to a drive to Stuttgart at 6:00 p.m. on the same day. In this case, the schedule calendar signal can describe, for example, the geographic coordinates and/or the specified time and/or a description text that is input by the user. As the point in time for the time scheduled for the trip, when the user needs the motor vehicle 10, it is possible to establish 6:00 p.m. (S3).

For establishing the required state of charge (S4), it is possible, for example, to analyze the descriptive text of the schedule information by way of a text analysis, with it being possible to recognize the words "drive" and "Stuttgart." For this purpose, known algorithms are familiar to the person skilled in the art.

On the basis of information relating to a current location of a motor vehicle 10, for example, it is possible to analyze, for example, a localization signal, such as, for example, a GPS signal, or preset information that can specify geographic coordinates of the workplace as a default setting.

The coordinates of the workplace and, for example, the city center or a preset address in Stuttgart can then be used to calculate a route of travel, for example, for which purpose, navigation systems and navigation programs are known to the person skilled in the art. On the basis of such a route of travel, it is then possible to determine the state of charge that the energy storage mechanism 12 should preferably have in order that it does not need to be recharged at all or as seldom as possible during the drive to Stuttgart.

In the example of FIG. 1, the control mechanism 28, for example, can establish (S4) the required state of charge at 100%, that is, establish that the energy storage mechanism 12 should be fully charged. As a threshold value, this value can be compared with the current state of charge, for example; in the example of FIG. 1, the current state of charge has dropped markedly below the threshold value.

In the present example, therefore, it seems reasonable to charge the energy storage mechanism 12 once again prior to beginning the drive, that is, before 6:00 p.m. The user of the motor vehicle 10 is able to work until 6:00 p.m., for example, and, for this reason, does not wish to drive to the charging station 16. In the method step S5, the control mechanism 28 sets the geographic coordinates of the charging station 16 as a drive destination for the charging operation. For this purpose, by way of example, it is possible for the control mechanism 28 to query the geographic coordinates of a plurality of charging stations 16, for example, or to analyze a database stored in the storage medium 34 (S8). As a selection criterion, it can be provided, for example, that the charging station 16 should be as near as possible to the workplace and, accordingly, to the parking location of the motor vehicle 10. Alternatively or additionally, an availability criterion can be checked (S6), which can describe an immediate availability or an availability that is favorable in terms of time for the charging facilities 18, and, for example, a workload of a plurality of charging stations can be checked. By way of example, an operator of the charging station 16 of FIG. 1 may have reported via the data communication link 35 that, for example, the "charging station #113" is not reserved and/or is free immediately.

In the example of FIG. 1, by way of example, between 8:00 a.m. and 6:00 p.m., there is time to charge the energy storage mechanism 12 and again to drive back to the parking location. However, in order that the motor vehicle 10 does not need to wait long at the charging station 16 or if, for example, less time is available, an immediate availability or an availability of a charging facility 18 within one of the specified periods of time and/or at one of the points in time that can be determined or specified by readout of the digital schedule calendar and/or of the schedule calendar signal, for example, is a more important criterion. The establishing of the parking period and/or of the parking location can take place in the method step S7, for example, by readout of the electronic schedule calendar and, for example, a localization signal of the motor vehicle 10.

In the method step S10, the control mechanism 28 generates a control signal, which describes the travel destination, that is, the geographic coordinates of the selected charging station 16, and, optionally, a desired state of charge (S10). In the method step S11, the generated control signal is then transmitted to the driver assistance mechanism 14 of the motor vehicle 10.

Optionally, the control signal can also describe a point in time when the motor vehicle 10 is to drive off. The driver assistance mechanism 14 can analyze the transmitted control signal and the transmitted control signal causes it to drive to the charging station 16. In other words, by way of the transmitted control signal, an operation of the driver assistance mechanism 14 (S12) takes place.

Figure 2:
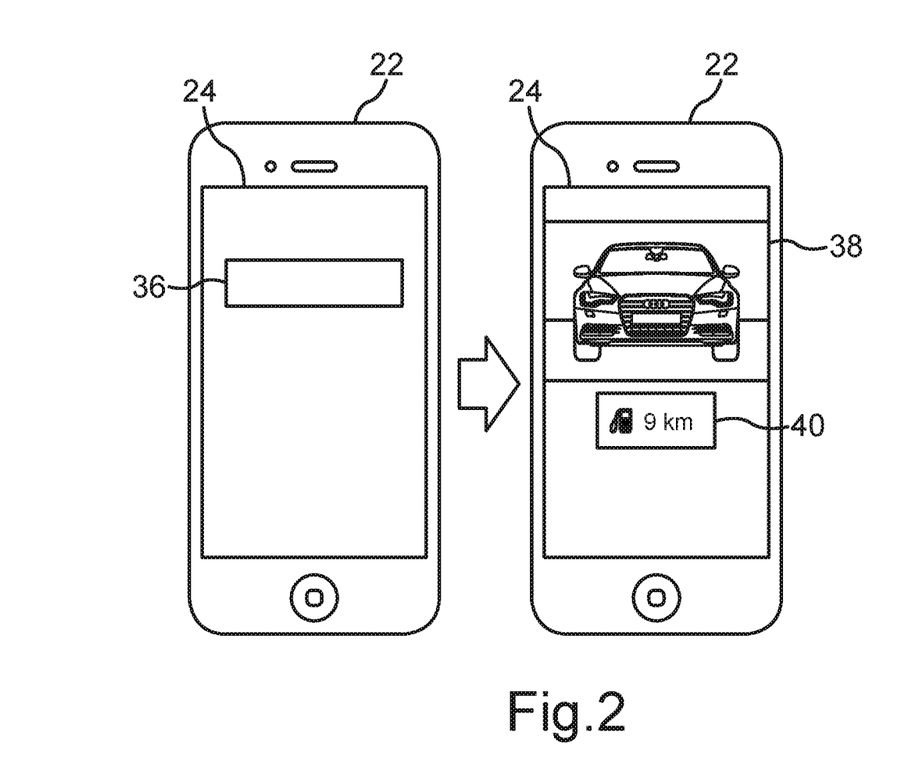
FIG. 2 a schematic illustration relating to another exemplary embodiment of the method according to the invention.

In accordance with another exemplary embodiment, it can be provided that, prior to the transmission of the control signal (S11), the control mechanism 28 can generate a notification signal (S13) and transmit it to the mobile terminal device (S14), said notification signal describing, for example, a text message to the user. The notification signal can be output, as is shown in FIG. 2, for example, by way of, for example, a message service. FIG. 2 shows a display field 36, which can be output by the screen 24, with the display field 36 displaying, for example, the text "Hey, would you like to drive to Stuttgart tomorrow to shop?" Such a message represents a communication between the user and the motor vehicle 10. The user can thereby be reminded, for example, of the time scheduled for the trip. In order to confirm the drive to the charging station 16, it is possible to provide, for example, that the user sends back a corresponding confirmation text or, for example, taps the touch-sensitive screen on the display field 36 or, for example, opens an application program ("app") (indicated by the wide arrow in FIG. 2). The mobile terminal device 22 shown in FIG. 2 shows, by way of example, a display field 38 output by the application program, by way of example, in which, for example, an image of the motor vehicle 10 is output. In another display field 40, it is possible to output, for example, information relating to a remaining range of travel, with the remaining range of travel being able to be just 9 kilometers ("9 km") in the example of FIG. 1, for example.

For confirmation or enabling of the drive to the charging station 16, the user can, for example, issue a voice command or tap the display field 40. As a function of such a control operation, the mobile terminal device can generate an activation signal, which can describe the enabling of the drive to the charging station 16 and transmit this activation signal to the control mechanism 28, which, in the method step S15, receives the transmitted activation signal (see FIG. 1).

Optionally, the control mechanism 28 can provide data—for example, through readout of a digital onboard log of the motor vehicle 10, which, for example, can be stored in the onboard computer of the motor vehicle 10 and/or in the storage medium 34 of the control mechanism 28—that can describe, for example, any maintenance work that is due. Alternatively or additionally, the control mechanism 28 can receive, for example, a signal from a motor vehicle sensor, for example, from a sensor for determining a wiper water level or an oil level. Alternatively, for example, a usual maintenance action, such as, for example, a washing of the motor vehicle 10, can be read out and/or selected from a digital list. The establishing of a maintenance action of a motor vehicle system (S16) can be produced in this way.

By way of example, via a query at the communication mechanism 20 of the charging station 16 or via a digital service list of the charging station 16, which is stored in the storage medium 34, for example, it can be determined whether the charging station 16 offers a corresponding provided service (S17). In the example of FIG. 1, the charging station 16 can be a so-called "AWC" station, that is, a station at which motor vehicles 10 can be charged and washed and/or parked. In the example of FIG. 1, the control mechanism 28 can then generate a service query signal (S18), which can describe a corresponding provided service. The service query signal can, for example, be transmitted via a mobile communication link, for example, to the mobile terminal device 22 (S19).

Figure 3:
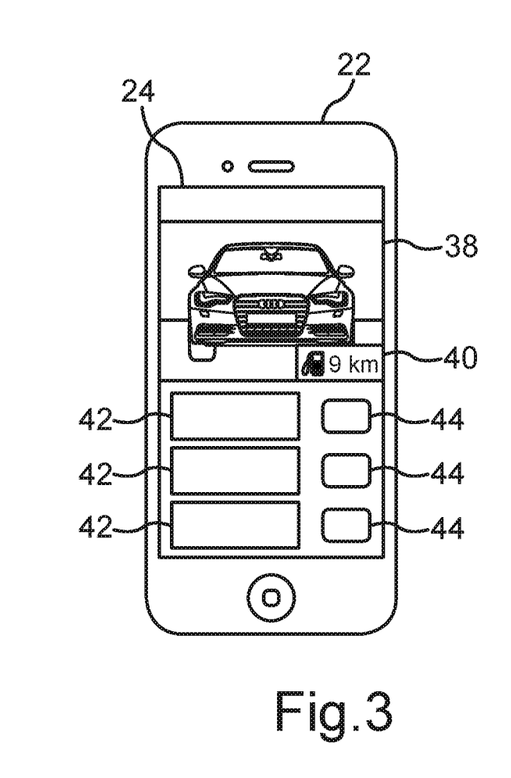
FIG. 3 a schematic illustration relating to another exemplary embodiment of the method according to the invention.

FIG. 3 shows, by way of example, an output by the mobile terminal device 22, in which, by way of example, in the display field 40, the current remaining range of travel ("9 km") can be indicated, and in which each of the display fields 42 can offer different provided services and, in a corresponding display field 44, an associated price for these provided services can be displayed and accordingly offered. The display fields 42 can, for example, display the following, optional provided service: " . . . driving to charging? Back at 1:54 p.m.," "Your wiper blades are old—new wiper blades—back at 2:30 p.m." and "Fill wiper water—back at 3:00 p.m." The optional specified times at which the motor vehicle 10 can be back at the parking location when the corresponding provided service is booked can be calculated, for example, on the basis of the empirical values stored in the storage medium 34 or can be determined depending on a corresponding query at the charging station 16.

The associated prices for the provided services can be output in the display fields 44—for example, "9.99 €," "20 €," and "10 €." Therefore, the drive to charging, by way of example, can cost 9.99 €, with the motor vehicle 10 then being back at 1:54 p.m. For 20 €, the user can book a replacement of the wiper blades, with the motor vehicle 10 then coming back only at 2:30 p.m. If the user also books the filling of the wiper water, this can cost the user 10 €, with the motor vehicle 10 then being able to be returned only by 3:00 p.m.

For booking of one provided service or a plurality of provided services, the user can tap, for example, the corresponding display field 42 and/or 44, as a consequence of which the mobile terminal device 22 generates a confirmation signal and transmits it to the control mechanism 28. The control mechanism 28 can receive the confirmation signal and subsequently generate an order signal, with the order signal describing the provided service that has been confirmed by the confirmation signal and booked by the user and describing the user's wish for carrying out this provided service (S21). In the method step S22, the generated order signal can then be transmitted to the communication mechanism 20 of the charging station and, for example, through an identification of the license plate upon arrival of the motor vehicle 10 at the charging station 16, the charging and the booked provided service(s) can be carried out.

Corresponding prices for the particular provided services can be preset or, for example, can be set depending on local prices of the charging station 16 (S23). For this purpose, the prices can be queried, for example. For payment of the booked provided service, the control mechanism 28 can then, depending on the confirmation signal, debit a corresponding monetary value, such as, for example, 9.99 € for the drive to the charging station 16 and 10 € for a booked filling of the wiper water, for example, from a digital account 46, with it being possible for the control mechanism 28 to access the account 46, for example, with the authorization of the user of the motor vehicle 10 or with it being possible, by tapping the display field 44 of the corresponding price, for example, to authorize debit of the corresponding amount (S24).

In accordance with another exemplary embodiment, the method can be used for coordinating a motor vehicle fleet, such as, for example, a motor vehicle fleet of the motor vehicle manufacturer, in regard to the charging of corresponding energy storage mechanisms. In this exemplary embodiment, a central coordination of a motor vehicle fleet in regard to the charging of corresponding energy storage mechanisms is made possible.

Overall, the exemplary embodiments show how, through the invention, a method for the comfortable charging of the energy storage mechanism 12, a so-called "comfort charging," is provided. In accordance with another exemplary embodiment, the motor vehicle 10 itself can report to the user—for example, by smartphone as, for example, a mobile terminal device 22 on the basis of, for example, profile data (for example: user has just parked empty motor vehicle 10, that is, motor vehicle 10 with empty or nearly empty energy storage mechanism 12, on Monday 8:00 a.m. at work and probably does not need it for the next 6 hours), preferably via the above-described notification signal, and thus queries whether, for example, it may drive to charging for the next 6 hours or, alternatively, is sent manually for charging. The motor vehicle 10 can then drive itself to charging.

In accordance with another exemplary embodiment, it is possible, for example, for a motor vehicle manufacturer to have charging stations built on a parking lot as charging facilities 18 and AWC spaces. The motor vehicle 10 can autonomously drive to the charging station 16 of the motor vehicle manufacturer of the example. There, it can pick up a service employee, who makes sure that it is charged and, afterwards, can send it back to the user.

When the motor vehicle 10 is at the charging station 16, additional offers can immediately be made to the user—for example, to fill up the wiper water and/or to wash the motor vehicle 10.

The invention claimed is:

1. A method for coordinating a charging operation for charging an energy storage mechanism of a piloted motor vehicle, the method comprising the following steps, which are carried out by a control mechanism external to the vehicle:
provision of a state-of-charge signal, which describes a current state of charge of the energy storage mechanism;
provision of a schedule calendar signal from a mobile terminal device, wherein the schedule calendar signal describes schedule information that is stored in a digital calendar and relates to a time schedule of a user of the motor vehicle and of the mobile terminal device;
conducting a textual analysis on descriptive text of the schedule calendar signal to identify a scheduled destination corresponding to a future scheduled event, wherein the scheduled destination identified through the textual analysis may lack a specific address;
on the basis of the provided schedule calendar signal: establishing a point in time of the time schedule which corresponds to the future scheduled event;
establishing of a required state of charge as a threshold value for enabling travel to the scheduled destination of the future scheduled event which eliminates a need to charge the energy storage mechanism and/or minimizes a number of recharging operations necessary to reach the scheduled destination of the future scheduled event;
provision of a data set that describes the respective geographic coordinates relating to a plurality of charging stations;
for each of the plurality of charging stations, determination of a workload of the respective charging facilities;
on the basis of the determined workload, determining at least one charging station as a travel destination that provides a freely available charging facility at a specified point in time or for a specified period of time in relation to the future scheduled event;
if the current state of charge corresponds to the threshold value or drops below the threshold value: choosing one of the at least one charging station which has or makes available at least one charging facility for charging the energy storage mechanism and setting geographic coordinates of a chosen charging station as the travel destination;
depending on the schedule information, generation of a control signal for steering the motor vehicle to the set geographic coordinates of the chosen charging station; and
transmission of the generated control signal to a driver assistance mechanism of the motor vehicle.

2. The method according to claim 1, further comprising:
on the basis of the provided schedule calendar signal: establishment of a parking parameter that describes a parking period in which the motor vehicle will not be used by the user and/or establishment of a parking location of the motor vehicle,
wherein the setting of the geographic coordinates of the charging station is made as a function of the established parking parameter.

3. The method according to claim 1, further comprising:
generation of a notification signal, which describes a message to the user relative to information about the current state of charge and/or a current remaining range of travel of the motor vehicle and/or a thematic context of the time schedule;
transmission of the generated notification signal to the mobile terminal device for emission by the mobile terminal device; and
after the transmission of the generated notification signal: receiving an activation signal from the mobile terminal device,
wherein the generation of the control signal and the transmission thereof to the driver assistance mechanism take place as a function of the received activation signal.

4. The method according to claim 1, further comprising:
determination of a maintenance action for providing a functional state of a motor vehicle system of the motor vehicle;
determination of whether the charging station offers a particular provided service in order to carry out the maintenance action;
if the charging station offers the particular provided service: generation of a service query signal that describes the maintenance action and/or the particular provided service;
transmission of the generated service query signal to the mobile terminal device for output by the mobile terminal device;
depending on a confirmation signal received from the mobile terminal device: generation of an order signal, which describes a release for carrying out the maintenance action and/or the particular provided service; and
transmission of the generated order signal to a communication mechanism of the charging station.

5. The method according to claim 4, further comprising:
setting of a price of the maintenance action and/or of the particular provided service,
wherein a) the generated service query signal describes the determined price and/or wherein b), when the confirmation signal is received, the control mechanism debits a monetary value in the amount of the determined price from an account of the user.

6. A tangible non-transitory storage medium containing a program code, which, when executed by a processor mechanism of a mobile terminal device and/or a motor vehicle and/or a server apparatus, is equipped to carry out a method comprising the steps according to claim 1.

7. A mobile, portable terminal device with a storage medium according to claim 5.

8. A server device for operation in the Internet, having a storage medium according to claim 5.

\* \* \* \* \*